(12) United States Patent
Morley et al.

(10) Patent No.: US 10,308,757 B2
(45) Date of Patent: Jun. 4, 2019

(54) FAST CURING HIGH GLASS TRANSITION TEMPERATURE EPOXY RESIN SYSTEM

(71) Applicant: Dow Global Technologies LLC, Midland, MI (US)

(72) Inventors: Timothy A. Morley, Schindellegi (CH); Rainer Koeniger, St. Gallenkappel (CH); Nebojsa Jelic, Wangen (CH); Rolf Hueppi, Gommiswald (CH); Zeljko Sikman, Schuebelbach (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/325,254

(22) PCT Filed: Nov. 3, 2015

(86) PCT No.: PCT/US2015/058717
§ 371 (c)(1),
(2) Date: Jan. 10, 2017

(87) PCT Pub. No.: WO2016/077095
PCT Pub. Date: May 19, 2016

(65) Prior Publication Data
US 2017/0233521 A1 Aug. 17, 2017

Related U.S. Application Data

(60) Provisional application No. 62/078,008, filed on Nov. 11, 2014.

(51) Int. Cl.
| | | |
|---|---|---|
| *B32B 27/38* | (2006.01) | |
| *B32B 27/26* | (2006.01) | |
| *B32B 27/04* | (2006.01) | |
| *C08J 5/24* | (2006.01) | |
| *C08G 59/38* | (2006.01) | |
| *C08G 59/50* | (2006.01) | |
| *C08G 59/24* | (2006.01) | |
| *C08G 59/08* | (2006.01) | |
| *C08G 59/22* | (2006.01) | |
| *C08J 5/04* | (2006.01) | |
| *C08L 63/04* | (2006.01) | |

(52) U.S. Cl.
CPC .......... *C08G 59/24* (2013.01); *C08G 59/08* (2013.01); *C08G 59/22* (2013.01); *C08G 59/502* (2013.01); *C08J 5/042* (2013.01); *C08J 2363/04* (2013.01)

(58) Field of Classification Search
None
See application file for complete search history.

(56) References Cited

U.S. PATENT DOCUMENTS

| | | |
|---|---|---|
| 3,306,872 A | 2/1967 | Maycock et al. |
| 3,341,580 A | 9/1967 | Hechenbleikner |
| 3,379,684 A | 4/1968 | Wiesner |
| 3,477,990 A | 11/1969 | Dante et al. |
| 3,547,881 A | 12/1970 | Mueller et al. |
| 3,637,590 A | 1/1972 | Landua |
| 3,843,605 A | 10/1974 | Schmidt et al. |
| 3,948,855 A | 4/1976 | Perry |
| 3,956,237 A | 5/1976 | Doorakian et al. |
| 4,048,141 A | 9/1977 | Doorakian et al. |
| 4,093,650 A | 6/1978 | Doorakian et al. |
| 4,131,633 A | 12/1978 | Doorakian et al. |
| 4,132,706 A | 1/1979 | Doorakian et al. |
| 4,171,420 A | 10/1979 | Doorakian et al. |
| 4,177,216 A | 12/1979 | Doorakian et al. |
| 4,302,574 A | 11/1981 | Doorakian et al. |
| 4,320,222 A | 3/1982 | Lopez |
| 4,358,578 A | 11/1982 | Brownscombe |
| 4,366,295 A | 12/1982 | Tyler, Jr. et al. |
| 4,389,520 A | 6/1983 | Gannon |
| 6,723,803 B1 * | 4/2004 | Hermansen et al. .. C08G 59/20 525/113 |
| 9,309,354 B2 | 4/2016 | Shields et al. |
| 9,321,880 B2 | 4/2016 | Grunder et al. |
| 2011/0319564 A1 * | 12/2011 | Corley .............. C08G 59/5006 525/132 |
| 2016/0347903 A1 | 12/2016 | Morley et al. |

FOREIGN PATENT DOCUMENTS

| | | | |
|---|---|---|---|
| JP | 05-125152 A | * 5/1993 | ............. C08G 59/50 |
| KR | 20110119272 A | 11/2011 | |
| WO | 2008140906 | 11/2008 | |
| WO | 2012136458 A1 | 10/2012 | |
| WO | 2014078218 | 5/2014 | |
| WO | 2014093115 A2 | 6/2014 | |

OTHER PUBLICATIONS

Machine translation of JP 05-125152 A (no date).*
Tertiary amines as highly efficient catalysts in the ring-opening reactions of epoxides with amines or thiols in H2O: expeditious approach to β-amino alcohols and β-aminothioethers. Jie Wu, Hong-Guang Xia, Green Chemistry 2005, 7, 708-710.

* cited by examiner

*Primary Examiner* — Michael J Feely

(57) ABSTRACT

A two-component curable epoxy resin system having an epoxy component containing a unique combination of two or more epoxy resins with at least one of the epoxy resins being an epoxy novolac type resin. The composite made from such resin system exhibits high glass transition temperature.

2 Claims, No Drawings

FAST CURING HIGH GLASS TRANSITION TEMPERATURE EPOXY RESIN SYSTEM

FIELD OF THE INVENTION

This invention relates to an epoxy based composition and processes for preparing fiber-reinforced composites.

INTRODUCTION

For many reasons, it is in some cases potentially advantageous to replace metal structural parts with reinforced organic polymers. Among the advantages the reinforced organic polymers offer include better resistance to corrosion, the ability to produce parts having complex geometries, and in some cases a superior strength-to-weight ratio. It is this last attribute that has led, and continues to lead, the adoption of reinforced polymers in the transportation industry as replacement for metal structural elements such as chassis members and other structural supports.

Epoxy resin systems are sometimes used as the polymer phase in such composites. Cured epoxy resins are often quite strong and stiff, and adhere well to the reinforcement. An advantage of epoxy resin systems, compared to most thermoplastic systems, is that low molecular weight, low viscosity precursors are used as starting materials. The low viscosity is an important attribute because it allows the resin system to penetrate easily between and wet out the fibers that usually form the reinforcement. This is necessary to avoid cosmetic blemishes such as flow lines and to produce a high strength composite.

Despite the potential advantages of these polymer composites, they have achieved only a small penetration into the automotive market. The main reason for this is cost. Metal parts can be produced using very inexpensive stamping processes that have the further advantage of producing parts at high operating rates. Polymer composites, on the other hand, must be produced in some sort of mold in which the polymer and reinforcing fibers are held until the polymer cures. The time required for this curing step directly affects production rates and equipment utilization, and therefore costs. Epoxy systems used for making these composites have required long in-mold residence times, and so the production cost has for the most part not been competitive with metal parts. Because of this, the use of epoxy resin composites to replace stamped metal parts has been largely limited to low production run vehicles.

It is believed that in-mold curing times need to be reduced into the range of approximately 3 to 5 minutes for epoxy composites to become competitive with stamped metal parts for high production volume vehicles.

The manufacturing method of choice for making these fiber-reinforced composites is a resin-transfer process, or one of its variants such as vacuum-assisted resin transfer molding (VARTM), the Seeman Composites Resin Infusion Molding Process (SCRIMP), gap resin transfer molding (also known as compression RTM) and wet compression molding. In these processes, the reinforcing fibers are formed into a preform which is placed and impregnated with a mixture of an epoxy resin component and a hardener which flows around and between the fibers, and is cured in a mold to form the composite.

The mold-filling step of these processes often takes 15 to 60 seconds or even more, depending on the size of the part and the particular equipment being used. During the entire mold-filling process, the resin system must maintain a viscosity low enough to allow it to flow between the reinforcing fibers and completely fill the mold. Resin systems formulated to cure rapidly also tend to build viscosity quite rapidly. If the fibers are pre-heated, which is often the case, the resin system can react very rapidly at points of contact with the heated fibers. The viscosity increase that accompanies this premature curing makes it difficult for the epoxy resin system to penetrate between fibers and wet them out. This will result in moldings having problems that range from the cosmetic (visible flow lines, for example) to structural (the presence of voids and/or poor adhesion of the cured resin to the reinforcing fibers, each of which leads to a loss in physical properties).

The problem of too-rapid viscosity build usually cannot be overcome by increasing operating pressures (i.e., the force used to introduce the resin system into the mold) because doing so can move the reinforcing fibers around within the mold, leading to spots that have little or no reinforcement and other regions in which the fibers are packed more densely. This causes inconsistent properties throughout the part, and a general weakening of the composite as a whole. Therefore, an epoxy resin system useful in resin transfer molding (and related) processes should not only have a low initial viscosity and cure rapidly, but should also build viscosity slowly during the initial stages of cure.

Another important consideration is the glass transition temperature of the cured resin. For curing epoxy resin systems, the glass transition temperature increases as the polymerization reactions proceed. It is generally desirable for the resin to develop a glass transition temperature in excess of the mold temperature so the part can be demolded without damage. In some cases, the polymer must in addition achieve a glass transition temperature high enough for the part to perform properly in its intended use. Therefore, in addition to the curing attributes already described, the epoxy system must be one which can attain the necessary glass transition temperature upon full cure.

A glass transition temperature greater than 110° C. is generally regarded as a minimum requirement for many structural composites; a preferred glass transition temperature is 120° C. and a more preferred glass transition temperature is 130° C. or more. This glass transition temperature ideally develops while the part is on the mold, rather than in some post-curing process, so that the composite is strong and rigid upon demolding and so can be demolded without being damaged, and additional costs of performing a post-curing step can be avoided.

The glass transition temperature of existing systems can be increased through the addition of a cycloaliphatic diamine crosslinker such as isophorone diamine. However the cycloaliphatic diamine reacts more slowly, and as a result it is necessary to increase mold temperatures very significantly in order to obtain short demold times. Even at a 120° C. mold temperature, demold times can be 50 to 100% longer when the cycloaliphatic diamine crosslinker is present. If higher mold temperatures are used, the open time becomes too short. Therefore, the system provides enhanced glass transition temperature at the expense of a much longer demold time and/or a much shorter open time, depending on the mold temperature that is selected. In any event, much higher mold temperatures are needed than is the case when the cycloaliphatic diamine is omitted.

Another very significant issue with the foregoing is the presence of diethylene triamine, which is coming under regulatory pressure in some jurisdictions. There is a strong desire to replace diethylene triamine with an alternative hardener, while retaining the benefits of low initial viscosity, good open time and fast cure. A higher glass transition temperature would be a further advantage, if it could be obtained without comprising the needed curing characteristics.

What is desired is a method for producing good quality fiber-reinforced epoxy resin composites with short cycle times. The epoxy resin system should have a long open time and a low initial viscosity, and should then cure rapidly to produce a composite in which the resin phase has a glass transition temperature of at least 120° C., preferably at least 130° C., and more preferably at least 150° C. or higher.

SUMMARY OF THE INVENTION

The present invention provides a curable resin system having:

1) an epoxy component containing two or more epoxy resins, wherein at least one of the epoxy resins comprises 1,4-cyclohexanedimethanol diglycidyl ether having an epoxy equivalent weight of up to about 140 and at least one other epoxy resin comprises an epoxy novolac resin; and 2) a hardener component comprising polyethylene tetraamine and 1,4-di-azabicyclo[2,2,2,]octane mixture.

The present invention also provides a composite made from such resin system and the composite has a glass transition temperature of at least 150° C.

DETAILED DESCRIPTION OF THE INVENTION

Applicants have found a unique resin system with the combination of an epoxy component and a hardener component to provide a unique and unexpected combination of extended open time and fast cure, while at the same time producing a high (>150° C.) glass transition temperature cured polymer. Mold temperatures needed to accomplish this generally do not exceed 160° C.

1. The Epoxy Component

In the present invention, the epoxy component contains two or more epoxy resins. The epoxy component contains at least 5% by weight of one epoxy resin which comprises 1,4-cyclohexanedimethanol diglycidyl ether, available from The Dow Chemical Company with a tradename XCM-35, having an epoxy equivalent weight of up to about 140. In the resin system of the present invention, the epoxy component contains about, based on the total weight of the epoxy component, more than 2 wt. %, preferably more than 5 wt. %, and more preferably more than 10 wt. % of such 1,4-cyclohexanedimethanol diglycidyl ether.

In a preferred embodiment, the other epoxy resins in the epoxy component contain epoxy novolac resins. Epoxy novolac resins useful in the present invention can be generally described as methylene-bridged polyphenol compounds, in which some or all of the phenol groups are capped with an epoxy containing group, typically by reaction of the phenol groups with epichlorohydrin to produce the corresponding glycidyl ether. The phenol rings may be unsubstituted, or may contain one or more substituent groups, which, if present are preferably alkyl having up to six carbon atoms and more preferably methyl. The epoxy novolac resin may have an epoxy equivalent weight of about 156 to 300, preferably about 170 to 225, more from 170 to 190, and most preferably from 176 to 181. The epoxy novolac resin may contain, for example, from 2 to 10, preferably 3 to 6, more preferably 3 to 5 epoxide groups per molecule. Among the suitable epoxy novolac resins are those having the general structure:

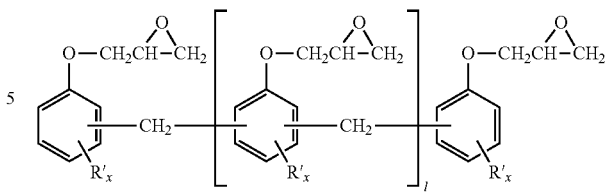

in which l is an integer from 0 to 8, preferably 1 to 4, more preferably 1 to 3, each R' is independently alkyl or inertly substituted alkyl, and each x is an integer from 0 to 4, preferably 0 to 2 and more preferably 0 to 1. R' is preferably methyl if present. In the resin system of the present invention, the epoxy component contains about, based on the total weight of the epoxy component, less than 90 wt. %, preferably less than 80 wt. %, and more preferably less than 70 wt. % of such epoxy novolac type resins.

Furthermore, the epoxy component may also contain optional ingredients. Among these are solvents or reactive diluents such as are described in WO 2008/140906, pigments, antioxidants, preservatives, impact modifiers, short (up to about 6 inches (15.24 cm) in length, preferably up to 2 inches (5.08 cm) in length, more preferably up to about ½ inch (1.27 cm) in length) reinforcing fibers, non-fibrous particulate fillers including micron- and nano-particles, wetting agents and the like. An electro-conductive filler may be present in the epoxy component.

2. The Hardener Component

The hardener component of the present resin system may be a polyethylene tetraamine mixture. By "polyethylene tetraamime mixture", it is meant a mixture of polyethylene polyamine compounds, of which at least 95% by weight, based on the total weight of the mixture, have exactly four amine nitrogen atoms. For purposes of this invention, those polyethylene polyamine compounds having exactly four amine nitrogen atoms are referred to as "polyethylene tetraamine" compounds.

The polyethylene tetraamine compound can be linear, branched and/or or cyclic. At least 40% of the weight of the polyethylene tetraamine mixture is linear triethylene tetraamine, i.e.:

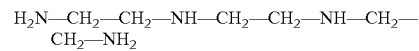

Linear triethylene tetraamine may constitute at least 60%, preferably at least 90%, more preferably at least 95%, and most preferably up to 100%, of the weight of the polyethylene tetraamine mixture, based on the total weight of the mixture.

The polyethylene tetraamine mixture may include other polyethylene tetraamine compounds such as, for example, N,N'-bis(2aminoethyl)piperazine, (piperazinoethyl)ethylenediamine and tris(aminoethyl)amine. These polyethylene tetraamine compounds are commonly present in significant amounts (up to, for example 55% or up to 35% by weight based on total weight of the hardener component in the aggregate) in commercially available TETA (triethylene tetraamine) products.

The polyethylene tetraamine mixture may include small amounts of other aliphatic or cycloaliphatic amine compounds having three or fewer amine nitrogen atoms or five or more amine nitrogen atoms. These compounds preferably constitute at most 5% by weight, preferably at most 2% by weight and more preferably at most 1% by weight of the polyethylene tetraamine mixture. The polyethylene tetraamine mixture preferably contains no more than 0.3% by weight of aminoethylethanol amine.

In a preferred embodiment, the polyethylene tetraamine mixture is the only hardener in the resin system. If other hardeners are present, they preferably constitute no more than 20%, more preferably no more than 10% and still more preferably no more than 5% by weight of the hardener component. Among the other hardeners that can be used are, for example, dicyandiamide, phenylene diamine (particularly the meta-isomer), bis(4-amino-3,5-dimethylpheny)-1,4-di-isopropylbenzene,bis(4-amino-phenyl)1,4-diiospropyl-benzene, diethyl toluene diamine, methylene dianiline, mixtures of methylene dianiline and polymethylene polyaniline compounds (sometimes referred to as PMDA, including commercially available products such as DL-50 from Air Products and Chemicals), diaminodiphenylsulfone, phenolic hardeners including those represented by the structure (III)

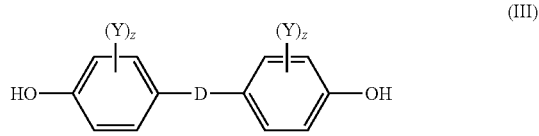

where each Y independently represents a halogen atom, each z is independently an integer from 0 to 4 and D is a divalent hydrocarbon group as described with regard to structure I above. Examples of suitable phenolic hardeners include dihydric phenols such as bisphenol A, bisphenol K, bisphenol F, bisphenol S and bisphenol AD, and mixtures thereof, and their mono-, di-, tri- and tetra-brominated counterparts and amino-functional polyamides. These are available commercially as Versamide® 100, 115, 125 and 140, from Henkel, and Ancamide® 100, 220, 260A and 350A, from Air Products and Chemicals.

The preferred hardener component for the present invention may include any of the hardener compositions as described in WO2014078218. A hardener mixture of a tin catalyst and a polyethylene tetraamine as disclosed in U.S. Provisional Patent Application No. 62/025,709, filed on Jul. 17, 2004, incorporated herein in its entirety, may also be used. In one preferred embodiment, the hardener component of the present invention contains over 90 wt. % of triethylenetetraamine and the rest being 1,4-diazabicyclo[2,2,2]octane, based on the total weight of the hardener component.

3. The Resin Composition

The hardener component and epoxy component are combined in amounts such that at least 0.8 epoxy equivalents are provided to the reaction mixture of the two components per amine hydrogen equivalent provided by the epoxy component. A preferred amount is at least 0.9 epoxy equivalents per amine hydrogen equivalent and a still more preferred amount is at least 1.0 epoxy equivalents per amine hydrogen equivalent. The epoxy component can be provided in large excess, such as up to 10 epoxy equivalents per amine hydrogen equivalent provided to the reaction mixture, but preferably there are no more than 2, more preferably no more than 1.25 and still more preferably no more than 1.10 epoxy equivalents provided per amine hydrogen equivalent. Embodiments in which the hardener is present in a small excess (for example from 0.0 to 0.80 epoxy equivalents per equivalent of amine hydrogens) often exhibit particularly short demold times while producing a cured resin having a high glass transition temperature.

In one embodiment, triethylene diamine is provided to the reaction mixture of epoxy and hardener components and performs a catalytic role. A suitable amount is about 0.01 to 0.5 moles of triethylene diamine per part per mole of per mole of primary and/or secondary amine compounds in the amine hardener. A preferred lower amount is 0.025 moles and a more preferred lower amount is 0.05 moles of triethylene diamine per mole of primary and/or secondary amine compounds in the amine hardener. A preferred upper amount is up to 0.25 moles and a more preferred upper amount is up to 0.20 moles of triethylene diamine, in each case per mole of primary and/or secondary amine compounds in the amine hardener. An especially preferred amount is 0.09 to 0.175 moles of triethylene diamine per mole of primary and/or secondary amine compounds in the amine hardener.

The catalyst can be used in conjunction with one or more other catalysts. If such an added catalyst is used, suitable such catalysts include those described in, for example, U.S. Pat. Nos. 3,306,872, 3,341,580, 3,379,684, 3,477,990, 3,547,881, 3,637,590, 3,843,605, 3,948,855, 3,956,237, 4,048,141, 4,093,650, 4,131,633, 4,132,706, 4,171,420, 4,177,216, 4,302,574, 4,320,222, 4,358,578, 4,366,295, and 4,389,520, and WO 2008/140906, all incorporated herein by reference. Examples of suitable catalysts are imidazoles such as 2-methylimidazole; 2-ethyl-4-methylimidazole; 2-phenyl imidazole; tertiary amines such as triethylamine, tripropylamine, N,N-dimethyl-1-phenylmethaneamine and 2,4,6-tris((di-methylamino)methyl)phenol and tributylamine; phosphonium salts such as ethyltriphenylphosphonium chloride, ethyltriphenylphosphonium bromide and ethyltriphenyl-phosphonium acetate; ammonium salts such as benzyltrimethylammonium chloride and benzyltrimethylammonium hydroxide; various carboxylic acid compounds, and mixtures of any two or more thereof.

In some other embodiments, the triethylene diamine is the sole catalyst provided to the reaction mixture. It is noted that the hardener components are not, for purposes of this invention, considered as catalysts.

In some embodiments, the reaction mixture, i.e., the resin system of the present invention, contains water and/or a compound having at least one hydroxyl group and an equivalent weight per hydroxyl group of up to 75, preferably up to 50. This compound, if present, is suitably present in small amounts, such as from 0.1 to 10 parts by weight, preferably from 0.25 to 5 parts and still more preferably from 1 to 3 parts by weight per part by weight of triethylene diamine. Besides water, suitable such compounds include, for example, alkanols such as methanol, ethanol, 1-propanol, 2-propanol, 1-butanol, 2-butanol, 1-pentanol, neopentanol, 1-hexanol and the like; alkylene glycols such as ethylene glycol, 1,2-propane diol, 1,3-propane diol, 1,4-butane diol, and neopentyl glycol; poly(alkylene glycols) such as diethylene glycol, triethylene glycol, dipropylene glycol, tripropylene glycol and the like; glycol monoethers such as ethylene glycol monomethyl ether, diethylene glycol monomethyl ether, 1,2-propane diol monomethyl ether, dipropylene glycol monomethyl ether, as well as the corresponding ethyl ethers; glycol monoesters such as ethylene glycol monacetate, diethylene glycol monoacetate, 1,2-propane diol monoacetate, dipropylene glycol monoacetate; higher functionality polyols such as glycerin, oligomers of glycerin, trimethylolpropane, trimethylolethane, pentaerythritol, erythritol, sorbitol, sucrose and the like; and mono- di- or trialkanolamines such as monoethanolamine, diethanolamine, triethanolamine, monoisopropanolamine, diisopropanolamine, triisopropanolamine, aminoethylethanolamine and the like.

The curable reaction mixture may also contain other optional components such as impact modifiers, internal mold release agents (IMR), pigments, antioxidants, preservatives, reinforcing fibers short (up to about 6 inches (15.24 cm) in length, preferably up to 2 inches (5.08 cm) in length, more preferably up to about ½ inch (1.27 cm) in length), non-fibrous particulate fillers including micron- and nanoparticles, wetting agents, internal mold release agents and the like. An electroconductive filler may be present in the hardener mixture.

Suitable impact modifiers include natural or synthetic polymers having a $T_g$ of lower than −40° C. These include natural rubber, styrene-butadiene rubbers, polybutadiene rubbers, isoprene rubbers, polyethers such as poly(propylene oxide), poly(tetrahydrofuran) and butylene oxide-ethylene oxide block copolymers, core-shell rubbers, mixtures of any two or more of the foregoing, and the like. The rubbers are preferably present in the form of small particles that become dispersed in the polymer phase of the resin system. The rubber particles can be dispersed within the epoxy resin or hardener and preheated together with the epoxy resin or hardener prior to forming the hot reaction mixture.

It is generally preferred to cure the epoxy resin and the hardener mixture in the presence of an internal mold release agent. Such an internal mold release agent may constitute up to 5%, more preferably up to about 1% of the total weight of the reaction mixture. Suitable internal mold release agents are well known and commercially available, including those marketed as Marbalease™ by Rexco-USA, Mold-Wiz™ by Axel Plastics Research Laboratories, Inc., Chemlease™ by Chem-Trend, PAT™ by Wirtz GmbH, Waterworks Aerospace Release by Zyvax and Kantstik™ by Specialty Products Co. In addition to (or instead of) adding the internal mold release agent during mixing, it is also possible to combine such an internal mold release agent into the epoxy component and/or the hardener component before the epoxy component and the hardener component are brought together.

Suitable particulate fillers have an aspect ratio of less than 5, preferably less than 2, and do not melt or thermally degrade under the conditions of the curing reaction. Suitable fillers include, for example, glass flakes, aramid particles, carbon black, carbon nanotubes, various clays such as montmorillonite, and other mineral fillers such as wollastonite, talc, mica, titanium dioxide, barium sulfate, calcium carbonate, calcium silicate, flint powder, carborundum, molybdenum silicate, sand, and the like. Some fillers are somewhat electroconductive, and their presence in the composite can increase the electroconductivity of the composite. In some applications, notably automotive applications, it is preferred that the composite is sufficiently electroconductive that coatings can be applied to the composite using so-called "e-coat" methods, in which an electrical charge is applied to the composite and the coating becomes electrostatically attracted to the composite. Conductive fillers of this type include metal particles (such as aluminum and copper), carbon black, carbon nanotubes, graphite and the like.

In some embodiments, the present resin system has, when cured at least one temperature between 100 and 150° C., a gel time of at least 10 seconds, at least 15 seconds, or preferably at least 20 seconds, and a demold time no greater than 300 seconds, preferably no greater than 240 seconds and still more preferably no greater than 120 seconds. In some embodiments, the demold time is no greater than 120 seconds or no greater than 60 seconds at this temperature. Gel time and demold time are for purposes of this invention measured by using a KraussMaffei Rim Star RTM 4/4 high-pressure injection machine where the gel time is measured during a curing evaluation test as described in the testing methods section of this application.

Thermoset resins are formed from the resin system of the invention by mixing the epoxy component and hardener component at proportions as described above and curing the resulting mixture. Either or both of the components can be preheated if desired before they are mixed with each other. It is generally necessary to heat the mixture to an elevated temperature to obtain a rapid cure. In a molding process such as the process for making molded composites, the curable reaction mixture is introduced into a mold, which may be, together with any reinforcing fibers and/or inserts as may be contained in the mold, preheated. The curing temperature may be, for example, from 60 to 180° C. When a long (at least 10 seconds, preferably at least 20 seconds) gel time is desirable, the curing temperature preferably is not greater than 160° C. When both a long gel time and a short demold time is wanted, a suitable curing temperature is 80 to 160° C., preferably 100 to 150° C. and especially 110 to 140° C.

It is preferred to continue the cure until the resulting resin system attains a glass transition temperature in excess of the cure temperature. The glass transition temperature at the time of demolding is preferably at least 120° C., more preferably at least 130° C., still more preferably at least 140° C. and even more preferably at least 150° C. An advantage of this invention is that such glass transition temperatures can be obtained with short curing times. This allows for short cycle times. Demold times at cure temperatures of 100 to 150° C., especially 110 to 140° C., are typically 300 seconds or less, preferably are 240 seconds or less and more preferably 180 seconds or less. In some embodiments, the demold time at such temperatures is no more than 120 seconds or no more than 60 seconds.

The resin system may be used in many composite making processes such as those described in U.S. Provisional Patent Application No. 61/936,899, filed on Feb. 7, 2014, incorporated herein in its entirety.

The following examples are provided to illustrate the invention, but not limit the scope thereof. All parts and percentages are by weight unless otherwise indicated.

Testing Methods
Differential Scanning Calorimetry (DSC):

Dynamic DSC was used to determine the Tg value of the resin systems. In a heating ramp of 10° C./min the samples were heated from 25-220° C., kept isothermal at 220° C. for three minutes, cooled in a ramp of 10° C. to 25° C., kept isothermal at 25° C. for three minutes, then heated again with a heating ramp of 10° C. to 220° C., kept isothermal at 220° C. for 3 minutes, and cooled in a ramp of 10° C. to 25° C. Tg onset and Tg midpoint are determined from the second heating segment.

Comparative Samples

All Comparative Samples 1-3 used 1,4-cyclohexanedimethanol diglycidyl ether as their epoxy component. Comparative Sample 1 used, as its hardener component of triethylene tetraamine (i.e., D.E.H™ 24 available from The Dow Chemical Company). Comparative Sample 2 used isophoronediamine ("IPDA") as its hardener component. Comparative Sample 3 used a hardener described in WO 2014078218, which is a blend of a triethylene tetraamine and triethylene diamine at a mole ratio of 1:0.1.

Inventive Sample

Inventive Sample 1 used the same hardener as in Comparative Sample 3. However, the epoxy component of Inventive Sample 1 is a mixture of about 20 wt % of 1,4- cyclohexanedimethanol diglycidyl ether and 80 wt % of an epoxy novolac based resin with an epoxy equivalent weight of 176 to 181.

The glass transition temperature of samples is evaluated following the method defined above whereby the sample mixtures were prepared by mixing the required amount of epoxy resin component and hardener component with a laboratory mixing device followed by addition of a small amount of the mixture (<15 mg) to an aluminum DSC pan. The testing results are summarized below in Table 1.

TABLE 1

Testing results for various samples

|  | Comparative Sample 1 (CS1) | Comparative Sample 2 (CS2) | Comparative Sample 3 (CS3) | Inventive Sample 1 (IS1) |
|---|---|---|---|---|
| Mixing ratio (wt.) epoxy resin:hardener | 100:17 | 100:30 | 100:18.8 | 100:15.7 |
| Tg onset (° C.) | 37 | 82 | 57 | 140 |
| Tg midpoint (° C.) | 44 | 89 | 64 | 151 |

CS1 demonstrates that in general a combination of a TETA based hardener and the cyclohexanedimethanol ("CHDM") based resin yields a material with a low glass transition temperature of only 44° C. This can be increased by the use of a cycloaliphatic based hardener such as IPDA which are well known for their positive effect on the glass transition temperature as shown in CS2. Furthermore when the TETA is modified to include the triethylene diamine component as shown in CS3, the glass transition temperature can also be increased as compared to CS1. However, when the hardener used in CS3 is used in conjunction with the CHDM resin blended with an epoxy novolac based resin, surprisingly, a glass transition temperature more than three times higher than that obtained in CS1 can be obtained without impacting the processability of the formulation in the formation of a composite article. The use of the CHDM resin is critical to the resin blend as the combination with the novolac yields a resin blend capable of a suitably low viscosity for manufacturing composites yet a high enough glass transition temperature for higher temperature performing articles. The use of the novolac as the sole resin would be unprocessable in standard equipment due to its extremely high viscosity of about 31000-40000 mPa·s @ 51.7° C.

To illustrate the process of making carbon fiber composite using the resin composition of the present invention, the resin composition of Inventive Sample 1 was prepared by mixing the required amount of resin component and hardener component with a laboratory mixing device followed by addition of approximately 300 g of the mixture directly on to a carbon fiber preform which was held inside an open mold at 130° C. Sufficient material was applied to reach the desired 50% fiber volume content in the final product. The mold was then closed and the material cured under compression. The mold employed for these trials was held in a 120-ton hydraulic up-stroke press. The mold was heated by a pressurized water heater.

Dynamic mechanical analysis (DMA) was conducted on the carbon fiber composite produced using a Mettler Toledo DMA861e in three point bend mode; heating rates were set to 5° C./minute. The results are summarized in Table 2. The glass transition temperature is taken as the maximum value of tan delta.

TABLE 2

Testing results of the carbon fiber composite made from Inventive Sample 1.

|  | Inventive Sample 1 |
|---|---|
| DMA Tg onset (° C.) | 129 |
| DMA peak Tan Delta (° C.) | 154 |

The values obtained from the DMA analysis confirm the carbon fiber composite article produced with 50 volume % carbon fibers can achieve an equivalent glass transition temperature to that obtained from the pure resin and hardener material, without the addition of carbon fibers.

The invention claimed is:

1. A cured fiber-reinforced composite made in a process comprising introducing a curable reaction mixture into a mold containing reinforcing fibers and curing the curable reaction mixture at a temperature of 100 to 150° C. until the curable reaction mixture cures and attains a glass transition temperature of at least 150° C. and demolding the resulting cured fiber-reinforced composite at a demold time of 240 seconds or less, wherein the curable reaction systems comprises 1) an epoxy component having two or more epoxy resins, wherein at least 5% by weight of the epoxy resins is a 1,4-cyclohexanedimethanol diglycidyl ether having an epoxy equivalent weight of up to about 140 and at least one other epoxy resin is an epoxy novolac resin having an epoxy equivalent weight of about 156 to 300; and 2) a hardener component comprising triethylene tetraamine wherein at least 40% of the weight of the triethylene tetraamine is a linear triethylene tetraamine having the chemical structure $H_2N-CH_2-CH_2-NH-CH_2-CH_2-NH-CH_2-CH_2-NH_2$.

2. The cured fiber-reinforced composite of claim 1, wherein the hardener component comprises over 90 wt % of triethylenetetraamine and the rest being 1,4-diazabicyclo[2,2,2]octane, based on the total weight of the hardener component.

* * * * *